United States Patent [19]
Lin

[11] Patent Number: 5,958,121
[45] Date of Patent: Sep. 28, 1999

[54] INK COMPOSITIONS AND MULTICOLOR THERMAL INK JET PRINTING PROCESS FOR THE PRODUCTION OF HIGH QUALITY IMAGES

[75] Inventor: John Wei-Ping Lin, Webster, N.Y.

[73] Assignee: Xerox Corporation, Stamford, Conn.

[21] Appl. No.: 09/046,895

[22] Filed: Mar. 24, 1998

[51] Int. Cl.$^6$ ..................................................... C09D 11/02
[52] U.S. Cl. ..................................... 106/31.43; 106/31.75
[58] Field of Search ............................. 106/31.43, 31.75

[56] References Cited

U.S. PATENT DOCUMENTS

| | | | |
|---|---|---|---|
| 4,197,135 | 4/1980 | Bailey et al. | 106/23 |
| 4,267,088 | 5/1981 | Kempf | 260/29.2 EP |
| 4,659,382 | 4/1987 | Kang | 106/22 |
| 5,091,005 | 2/1992 | Mueller et al. | 106/22 |
| 5,106,416 | 4/1992 | Moffatt et al. | 106/20 |
| 5,116,409 | 5/1992 | Moffatt | 106/22 |
| 5,133,803 | 7/1992 | Moffatt | 106/25 |
| 5,181,045 | 1/1993 | Shields et al. | 346/1.1 |
| 5,198,023 | 3/1993 | Stoffel | 106/22 R |
| 5,250,107 | 10/1993 | Bares | 106/20 R |
| 5,320,668 | 6/1994 | Shields et al. | 106/20 R |
| 5,342,440 | 8/1994 | Wickramanayake | 106/22 R |
| 5,428,383 | 6/1995 | Shields et al. | 347/96 |
| 5,476,540 | 12/1995 | Shields et al. | 106/20 R |
| 5,488,402 | 1/1996 | Shields et al. | 347/96 |
| 5,518,534 | 5/1996 | Pearlstine et al. | 106/20 R |
| 5,531,817 | 7/1996 | Shields et al. | 106/22 R |
| 5,549,740 | 8/1996 | Takahashi et al. | 106/31.43 |
| 5,565,022 | 10/1996 | Wickramanayake | 106/22 R |
| 5,594,045 | 1/1997 | Alexiou | 106/31.75 |
| 5,624,484 | 4/1997 | Takahashi et al. | 106/37.75 |
| 5,693,129 | 12/1997 | Lin | 106/31.43 |
| 5,735,941 | 4/1998 | Feeman et al. | 106/31.43 |
| 5,835,116 | 11/1998 | Sato et al. | 106/31.43 |
| 5,888,285 | 3/1999 | Gundlach et al. | 106/31.75 |

FOREIGN PATENT DOCUMENTS 57-198768  12/1982  Japan.

*Primary Examiner*—Helene Klemanski
*Attorney, Agent, or Firm*—Judith L. Byorick

[57] ABSTRACT

Disclosed is a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink, thereby enabling reduced intercolor bleed.

24 Claims, No Drawings

INK COMPOSITIONS AND MULTICOLOR THERMAL INK JET PRINTING PROCESS FOR THE PRODUCTION OF HIGH QUALITY IMAGES

BACKGROUND OF THE INVENTION

The present invention is directed to aqueous ink compositions and ink jet printing processes. More specifically, the present invention is directed to aqueous ink compositions particularly suitable for the production of high quality images on print substrates. The ink compositions for the present invention reduce intercolor bleed and enhance optical density. The present invention is also directed to multicolor ink jet printing processes for the production of high quality images on print substrates. One embodiment of the present invention is directed to a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink, thereby enabling reduced intercolor bleed.

Ink jet printing is a non-impact printing method which produces droplets of ink that are deposited on a print substrate in response to electronic digital data signals. Ink jet systems generally are of two types: continuous stream and drop-on-demand. In continuous stream ink jet systems, ink is ejected in a continuous stream under pressure through at least one orifice or nozzle. The stream of ink is periodically perturbed by pressure regulation in accordance with digital signals, causing it to break up into droplets at a fixed distance from the nozzle. At the break-up point, the charged ink droplets pass through an electrical field which adjusts the trajectory of each ink droplet to direct it to a gutter for ink circulation or to a specific location on a print substrate to produce an image. In a drop-on-demand system, an ink droplet is expelled from a nozzle directly onto a print substrate in accordance with digital data signals. Generally, a droplet is not formed or expelled unless it is to be placed on a print substrate.

Drop-on-demand systems are simpler than continuous stream systems since they do not require ink recovery, charging, or deflection. There are three types of drop-on-demand ink jet systems. One type of drop-on-demand system has an ink-filled channel or passageway having a nozzle on one end and a piezoelectric transducer near the other end to produce pressure pulses according to digital data signals. Multiple ink nozzles are used to deliver ink droplets onto a print substrate in an imagewise fashion. Several printheads and inks are used in a multicolor piezoelectric ink jet printing system. High resolution images can be obtained with this system. Examples of this system include the Epson 600 and 800 ink jet printers.

Another type of drop-on-demand ink jet printing system is called acoustic ink jet printing, which can be operated at high frequency and high resolution. Acoustic ink jet printing uses a focused acoustic beam formed with a spherical lens illuminated by a plane wave of sound created by a piezoelectric transducer. The focused beam reflected from a surface exerts a pressure onto the surface of the liquid ink, resulting in ejection of small droplets of ink onto a print substrate. An array of nozzles and corresponding transducers are used in an acoustic ink jet printing process to produce images on a print substrate in an imagewise fashion. Different types and configurations of acoustic printheads and substrate arrangements are possible. In a multicolor ink jet printing process, several acoustic ink jet printheads are used to deliver different inks onto a print substrate. Aqueous inks can be used in this drop-on-demand acoustic ink jet printing system. Examples of acoustic ink jet printing systems are disclosed in, for example K. A. Krause, "Focusing Ink Jet Head," *IBM Technical Disclosure Bulletin*, Vol 16, No. 4, September 1973, pp. 1168–1170, and in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Another type of drop-on-demand printing system is thermal ink jet printing. Thermal or bubble jet drop-on-demand ink jet printers have found broad applications as output for personal computers in the office and in the home. In thermal ink jet printing processes, the printhead typically comprises one or more ink jet ejectors, as disclosed in, for example, U.S. Pat. No. 4,601,777, U.S. Pat. No. 4,532,530, U.S. Pat. No. 4,412,224, U.S. Pat. No. 4,410,899, U.S. Pat. No. 4,251,824, U.S. Pat. No. 4,532,530, U.S. Pat. No. 4,601,777, U.S. Pat. No. 4,840,674, U.S. Pat. No. 5,145,518, U.S. Pat. No. 5,281,261, and U.S. Pat. No. 5,531,818, the disclosures of each of which are totally incorporated herein by reference. Each ejector includes a channel communicating with an ink supply chamber, or manifold, at one end and an opening at the opposite end, referred to as a nozzle. A thermal energy generator, usually a resistor, is located in each of the channels at a predetermined distance from the nozzles. The resistors are individually addressed with a current pulse to vaporize the ink momentarily within the respective channel to form a bubble that expels an ink droplet. As the bubble grows, the ink rapidly bulges from the nozzle and is momentarily contained by the surface tension of the ink as a meniscus. This phenomenon is temporary, and the ink is quickly propelled toward a print substrate. As the bubble begins to collapse, the ink still in the channel between the nozzle and the bubble starts to move towards the collapsing bubble, causing a volumetric contraction of the ink at the nozzle and resulting in the separation from the nozzle of the bulging ink as a droplet. The acceleration of the ink out of the nozzle while the bubble is growing provides the momentum and velocity for propelling the ink droplet in a substantially straight direction toward a print substrate, such as a piece of paper. Important properties of the ink in this context include viscosity and surface tension. Because the droplet of ink is emitted only when the resistor is actuated, thermal ink jet printing is a drop-on-demand system.

In a drop-on-demand ink jet printing apparatus, the printhead typically comprises a linear array of ejectors, and the printhead (with or without partition) is moved relative to the surface of the print substrate, either by moving the print substrate relative to a stationary printhead, or vice-versa, or both. In some apparatus, a relatively small printhead moves across a print substrate numerous times in swaths (i.e., multiple passes) to print a desired image. In this instance, the desired image is produced completely on a print substrate in several swaths before the substrate is advanced. This type of printing is called multi-pass (multiple pass) or checkerboard ink jet printing. In checkerboard ink jet printing (or multiple pass), the printhead passes over the print substrate and provides ink at desired locations (for example, printing only even or odd numbered dots in a swath). On one or more subsequent passes, the remaining dots in the image are printed before the print substrate is advanced. Multiple ink jet printheads and ink cartridges can be used to produce multiple color images on a print substrate. Alternatively, a printhead can be partitioned into several sections (for example, three small sections including cyan, magenta, and yellow inks) and equipped with different ink chambers, ink storage media, and inks in a multicolor ink jet printing system. These multicolor systems are commonly employed in desktop ink jet printers, including thermal ink jet printers. They produce good multicolor images on plain paper, but at a slower printing speed. Slightly higher printing speed can be achieved, however, by increasing ink jetting frequency and printhead sweeping rate.

Alternatively, a stationary ink jet printhead that consists of an array of ejectors and extends the full width of a print substrate can pass ink down the print substrate to give full page images, in what is known as a "full width array" ink jet printer. When the printhead and the print substrate are moved relative to each other, imagewise digital data is used to activate the thermal energy generators or resistors selectively in the printhead over time so that the desired image can be created quickly on the print substrate in a single pass mode. The full width array printhead is generally preferred to be in a stationary position while the print substrate is continuously moving to receive inks as it passes through the printhead or printheads. The full width array printhead or printheads can also, however, be moved across the print substrate if desired. In a multicolor ink jet printing process, several full width array printheads, including cyan, magenta, yellow, and black printheads, as well as other optional printheads and their corresponding inks, can be used to provide different colored images on the print substrate at a high speed. Fast ink jet printing can be achieved by using the full width array printheads.

In a multicolor ink jet printing process, several inks can be printed on a print substrate. In some instances two different inks can be printed next to each other. Intercolor bleed can occur if the inks are not dried properly or if the printing process is too fast for the ink set. Undesired ink mixing on a print substrate, especially on the surface of a plain paper, can cause severely distorted images near the border of two inks. After ink drying, the border of the two inks shows irregular structure with poor edge sharpness (or raggedness) because of the invasion of one ink into the other. The bleed images are not desirable and can be detected easily by eyes. This phenomenon is called intercolor bleed or color bleed. Intercolor bleed occurs particularly when a darker ink (such as a black ink) and a lighter ink (such as a yellow ink, a cyan ink, magenta ink, or the like) are printed next to each other, because of high contrast between the two colors. Intercolor bleed can also occur when two color inks are printed next to each other (for example, a yellow ink next to a magenta ink, a yellow ink next to a cyan ink, a magenta ink next to a cyan ink, or the like). The severity of the intercolor bleed generally is affected by ink type and composition, absorption rate of the printed substrate, printhead design, ink drop mass, ink dot size, and method and speed of printing. There is a need to reduce intercolor bleed and to produce high quality multicolor ink jet images on print substrates, including plain and coated papers, transparencies, textiles, and other desired substrates.

U.S. Pat. No. 5,091,005 (Mueller et al.), the disclosure of which is totally incorporated herein by reference, discloses inks comprising, by weight, from about 4% to about 10% formamide, from about 1% to about 10% dye, and the balance water when printed on paper from an ink jet printer have improved resistance to bleed, especially when printed at a rate up to about 3.7 kHz.

U.S. Pat. No. 5,116,409 (Moffatt), the disclosure of which is totally incorporated herein by reference, discloses the alleviation of color bleed (the invasion of one color into another on the surface of the print medium) using ink jet inks by employing zwitterionic surfactants (pH-sensitive or pH-insensitive) or ionic or nonionic amphiphiles. The inks comprise a vehicle and a dye. The vehicle typically comprises a low viscosity, high boiling point solvent, one or two amphiphiles at concentrations above their critical micelle concentration (cmc), while the dye typically comprises any of the dyes commonly employed in ink jet printing. The amount of surfactant/amphiphile is described in terms of its critical micelle concentration (cmc), which is a unique value for each amphiphile. Above the cmc, micelles form, which attract the dye molecule and thus control the color bleed. Below the cmc, there is no micelle formation, and thus no control of the color bleed.

U.S. Pat. No. 5,106,416 (Moffatt et al.), the disclosure of which is totally incorporated herein by reference, discloses the alleviation of color bleed (the invasion of one color into another on the surface of the print medium) using ink jet inks by employing zwitterionic surfactants (pH-sensitive or pH-insensitive) or ionic or non ionic amphiphiles. The inks of the invention comprise a vehicle and a cationic dye. The vehicle typically comprises a low viscosity, high boiling point solvent, one or two amphiphiles at concentrations above their critical micelle concentration (cmc), while the dye typically comprises any of the dyes commonly employed in ink jet printing. The amount of surfactant/amphiphile is described in terms of its critical micelle concentration (cmc), which is a unique value for each amphiphile. Above the cmc, micelles form, which attract the dye molecule and thus control the color bleed. Below the cmc, there is no micelle formation, and thus no control of the color bleed.

U.S. Pat. No. 5,133,803 (Moffatt), the disclosure of which is totally incorporated herein by reference, discloses the control of color bleed (the invasion of one color into another on the surface of the print medium) using ink jet inks by employing high molecular weight colloids, such as alginates, in conjunction with amphoteric surfactants and/or nonionic amphiphiles. The inks disclosed comprise a vehicle and a dye. The vehicle typically comprises a low viscosity, high boiling point solvent and one or two surfactants at concentrations above their critical micelle concentration (cmc), while the dye typically comprises any of the dyes commonly employed in ink jet printing. The amount of surfactant is described in terms of its critical micelle concentration (cmc), which is a unique value for each surfactant system. Above the cmc, colloidal species form, which attract the dye molecules and thus control the color bleed. Below the cmc, there is no colloid, and thus poor control of the color bleed results. Also, the presence of the high molecular weight colloid further improves the text print quality and renders sharper definition among colors printed adjacent one another.

U.S. Pat. No. 5,181,045 (Shields et al.), the disclosure of which is totally incorporated herein by reference, discloses certain dyes which become insoluble under specific and well defined pH conditions. By forcing a dye to become insoluble on the page, migration of the dye is inhibited, thereby helping to reduce bleed between inks of different colors. The dye is forced out of solution from the ink by contact with another ink having the appropriate pH (either higher or lower than that of the first ink).

U.S. Pat. No. 5,320,668 (Shields et al.), the disclosure of which is totally incorporated herein by reference, discloses certain colorants which become insoluble under specific and well defined pH conditions. By forcing a colorant to become insoluble on the page, migration of the colorant is inhibited, thereby helping to reduce bleed between inks of different colors. The colorant is forced out of solution from the ink by contact with another ink having the appropriate pH (either higher or lower than that of the first ink). In particular, an ink containing a colorant comprising a pigment in combination with a pH sensitive dispersant is used in conjunction with an ink of the appropriate pH.

U.S. Pat. No. 5,342,440 (Wickramanayake), the disclosure of which is totally incorporated herein by reference, discloses water insoluble black dyes which are formulated in a microemulsion based ink. When printed adjacent to color inks (yellow, magenta, cyan) containing water soluble dyes, bleed does not occur between the black and the color dyes.

U.S. Pat. No. 5,476,540 (Shields et al.), the disclosure of which is totally incorporated herein by reference, discloses a method for controlling color bleed between adjacent multicolor ink regions on a print medium. Color bleed involves the migration of color agents between adjacent zones in a multicolored printed image on a print medium. A first composition containing a gel forming species and a color agent is brought into contact on a region of the print medium with a second composition having a color agent and a gel initiating species or chemical conditions which bring about gelation. In alternative embodiments, the print medium can be pretreated with either a gel initiating species or a gel forming species (with no colorant), followed by treatment with a gel forming species or gel initiating species (with colorant), respectively. The formation of the gel upon the print medium impedes the movement of the color agent or agents and thus reduces the color bleed between adjacent zones.

U.S. Pat. No. 5,531,817 (Shields et al.), the disclosure of which is totally incorporated herein by reference, discloses the control of color bleed (the invasion of one color into another on the surface of the print medium) using ink jet inks by employing either high molecular weight polymers that exhibit a reversible gelling nature with heat or certain amine oxide surfactants that undergo sol-gel transitions. The inks further include a vehicle and a dye. The vehicle typically comprises a low viscosity, high boiling point solvent and water. Certain high molecular weight polymers, under the correct solution conditions, can form gels which can be subsequently melted by heating of the gel. When the melted gel is cooled, it will then reform into a gel. The viscosity of an ink employing such a gel can be reduced to a viscosity low enough to permit jetting from the print cartridge. After leaving the print cartridge, the melted gel will again reform into a highly viscous gel to immobilize the droplet of ink and prevent its migration on the media. Therefore, two drops of different colors, when printed next to one another will thus be inhibited from migrating or bleeding into one another.

U.S. Pat. No. 5,565,022 (Wickramanayake), the disclosure of which is totally incorporated herein by reference, discloses ink jet ink compositions which exhibit fast dry times and bleed free prints when printed onto a print medium so that the throughput of an ink jet printer can be increased. The ink compositions comprise (a) at least one dye; (b) at least one high boiling, water insoluble organic compound; (c) at least one amphiphile; and (d) water. The dye can be either water soluble or water insoluble and the high boiling organic compound has a vapor pressure low enough such that only water evaporates from the ink during normal printing operations. The amphiphile is present in an amount sufficient to solubilize the water insoluble organic compound in the water. Preferably, the amphiphile belongs to a class of compounds known as hydrotropes.

U.S. Pat. No. 5,198,023 (Stoffel), the disclosure of which is totally incorporated herein by reference, discloses an ink set in which bleed between yellow and black inks is reduced by using a cationic yellow dye in the yellow ink and an anionic dye in the black ink. Bleed is further reduced by adding a multivalent precipitating agent to the yellow ink. With regard to bleed between yellow and other color inks (cyan and magenta), bleed is reduced by also employing anionic dyes in the color inks.

U.S. Pat. No. 5,428,383 (Shields et al.) and U.S. Pat. No. 5,488,402 (Shields et al.), the disclosures of each of which are totally incorporated herein by reference, disclose a method for controlling color bleed in multicolor thermal inkjet printing systems. Color bleed involves the migration of coloring agents between adjacent zones in a multicolor printed image on a substrate. To control color bleed between any two ink compositions in a multi-ink system, at least one of the ink compositions will contain a precipitating agent (such as a multivalent metal salt). The precipitating agent is designed to react with the coloring agent in the other ink composition of concern. As a result, when the two ink compositions come in contact, a precipitate is formed from the coloring agent in the other ink composition which prevents migration thereof and color bleed problems. This technique is applicable to printing systems containing two or more ink compositions, and enables distinct multicolor images to be produced without the problems normally caused by color bleed.

U.S. Pat. No. 5,518,534 (Pearlstine et al.), the disclosure of which is totally incorporated herein by reference, discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C.

U.S. Pat. No. 5,250,107 (Bares), the disclosure of which is totally incorporated herein by reference, discloses a water-fast ink composition and method for making the same. A selected chemical dye having at least one functional group with an extractable hydrogen atom thereon (such as —COOH, —NH$_2$, or —OH) is combined with an ammonium zirconium polymer salt (such as ammonium zirconium carbonate, ammonium zirconium acetate, ammonium zirconium sulfate, ammonium zirconium phosphate, and ammonium zirconium oxalate). The resulting mixture preferably contains about 0.01–5.0% by weight ammonium zirconium polymer salt and about 0.5–5.0% by weight chemical dye. Upon dehydration of the mixture, the ammonium zirconium polymer salt and chemical dye form a cross-linked dye complex which is stable and water-fast. The mixture can be dispensed onto a variety of substrates (e.g. paper) using thermal inkjet or other printing systems.

U.S. Pat. No. 4,267,088 (Kempf), the disclosure of which is totally incorporated herein by reference, discloses coatings particularly useful as marking inks in which an epichlorohydrin-modified polyethyleneimine and an ethylene oxide-modified polyethyleneimine cooperate in aqueous solution to form a composition capable of application to form deposits adherent to most materials and resistant to most organic solvents but readily removable by water.

U.S. Pat. No. 4,197,135 (Bailey et al.), the disclosure of which is totally incorporated herein by reference, discloses an ink for use in ink jet printers containing a water soluble dye and a polyamine containing 7 or more nitrogen atoms per molecule, with the ink composition having a pH of 8 or above, the upper pH limit being dye decomposition dependent. The ink has improved waterfastness over an equivalent ink formulation without the polyamine additive.

U.S. Pat. No. 4,659,382 (Kang), the disclosure of which is totally incorporated herein by reference, discloses an ink jet ink composition comprising a major amount of water, a hydroxyethylated polyethyleneimine polymer, and a dye component, wherein the polymer has incorporated therein from about 65 to about 80 percent by weight of hydroxyethyl groups.

U.S. Pat. No. 5,693,129 (Lin), the disclosure of which is totally incorporated herein by reference, discloses an ink jet ink composition which comprises water; a colorant selected from the group consisting of a dye, a pigment, and a mixture of a dye and pigment; and a material selected from the group consisting of (1) a hydroxyamide derivative having at least one hydroxyl group and at least one amide group; (2) a mercaptoamide derivative having at least one mercaptol group and at least one amide group; (3) a hydroxythioamide derivative having at least one hydroxyl group and at least one thioamide group; (4) a mercaptothioamide derivative having at least one mercaptol group and at least one thioamide group; (5) an oxyalkylene(alkyleneoxide) reaction product of the above said derivatives; (6) a thioalkylene (alkylenesulfide) reaction product of the above said derivatives; and (7) mixtures thereof. The inks comprising the said ink jet ink composition exhibit good latency especially in a high resolution thermal ink jet printhead (for example, 600 spi) and can be printed onto a print substrate either with or without heat for the drying to give excellent images with reduced curl and cockle.

Japanese Patent publication 57-198768, the disclosure of which is totally incorporated herein by reference, discloses a type of water-base ink made of acidic dye and/or direct dye, cationic water-soluble resin, water-soluble organic solvent, and water.

Although some of the aforementioned references describe ink compositions for the reduction of intercolor bleed, a need remains for ink compositions suitable for high resolution and high speed ink jet printing. A major concern with all ink jet printers, and with high resolution ink jet printers in particular, is clogging of the nozzles during operation and between operations. This clogging is caused by evaporation of an organic solvent or water from the opening of the nozzle. In dye based inks, this evaporation can cause crystallization or precipitation of soluble ink components, such as dyes or solid additives, as well as causing an increase in ink viscosity. In pigment based inks, this evaporation can cause precipitation of the pigment particles because of flocculation or aggregation, or precipitation of solid additives, as well as causing an increase in ink viscosity. Initial evaporation of water and solvent generally causes an increase in ink viscosity, which affects the ability of the heater or resistor of a printhead to fire a drop of ink properly through the nozzle.

Accordingly, a desirable characteristic of ink jet inks is the ability of the ink to remain in a fluid and jettable condition in a printhead opening that is exposed to air. The maximum idling time that still allows a printhead to jet a first drop of ink with a transit time of 100 microseconds or less wherein the ink travels a distance of 0.5 millimeters after a period of nonuse or idling is called the latency (1st drop) or decapped time. The maximum idling time that still allows a printhead to jet a 9th drop of ink with a transit time of 100 microseconds or less wherein the ink travels a distance of 0.5 millimeters after a period of nonuse or idling is called the 9th drop latency or decapped time. This test is run with the printhead or nozzles uncovered or decapped and generally at a relative humidity of 15 percent. The time interval is the longest period of time that the printhead, uncovered, will still fire a specified drop (1st drop or 9th drop) without a failure. The longer the latency (1st drop latency or 9th drop latency) time rating, the more desirable is the ink for use in an ink jet printer.

The inception of clogging can also cause distortion of the image or alphanumeric characters being printed by the printhead. This distortion can appear as a drop of ink that is displaced from its intended position. Sometimes two drops of ink will be formed equally spaced from the intended target position. Misplacement of the ink drops can also lead to intercolor bleed and poor image quality as a result of the undesired mixing of two color inks in a multicolor ink jet printing process. Intercolor bleed occurs particularly near the border areas of two colors. Sometimes small numerous satellite drops are also produced. On some occasions the drop can even reach its intended position but at a lower drop volume or drop mass and produce a lower optical density image. Ultimately, the clogged nozzle can fail to fire entirely, and no image can be generated on a print substrate, resulting in an image defect.

With the demand for higher resolution printers, the nozzles of printheads in ink jet printers are correspondingly decreasing in size. Nozzle openings of a printhead are typically about 50 to 80 microns in width or diameter for a 300 spots per inch (300 spi) resolution printhead. With the advent of higher resolution (for example, 360 spi, 400 spi, 600 spi, 720 spi, and the like) printheads, these nozzle openings are even smaller, and are typically about 10 to about 49 microns in width or diameter. These printheads with small nozzle dimensions can require special inks that do not easily clog the small nozzle openings.

Some antibleed ink compositions comprising gel-like materials or multivalent metal salts in combination with certain incompatible colorants can have difficulty in jetting effectively through the small nozzles of a high resolution printhead. Thus, a need remains for ink jet ink compositions that not only enable reduced intercolor bleed, but also exhibit the ability to be used in a high resolution printhead.

In a high speed ink jet printer, inks preferably are able to print at a high frequency, preferably at least 4 KiloHertz. Inks containing high molecular weight materials can have high viscosity and are not particularly suitable for fast ink jet printing. In addition, inks with high viscosity tend to have even higher viscosity upon water and solvent evaporation (due to idling), which results in short ink latency, poor ink jettability, and slow refill. Such inks may not be suitable for high speed ink jet printing. Antibleed inks that can function in a high resolution printhead with a high frequency response are desirable because they allow the inks to be printed at a high speed with good throughput and good print quality. There is also a need for the development of ink jet ink compositions that exhibit low viscosity with good jettability and refill characteristic in addition to the ability to reduce intercolor bleed.

Accordingly, while known compositions and processes are suitable for their intended purposes, a need remains for improved multicolor thermal ink jet printing processes. In addition, a need remains for multicolor thermal ink jet printing processes wherein the prints generated exhibit reduced intercolor bleed. Further, a need remains for multicolor thermal ink jet printing processes wherein the prints generated exhibit excellent image quality. Additionally, a need remains for multicolor thermal ink jet printing processes with rapid printing times. There is also a need for multicolor thermal ink jet printing processes wherein the prints generated exhibit improved optical density of the black and/or color image areas. In addition, there is a need for multicolor thermal ink jet printing processes which employ materials, software, and hardware of low cost. Further, there is a need for multicolor thermal ink jet printing processes which enable reduced kogation. Additionally, there is a need for multicolor thermal ink jet printing processes which can be used in conjunction with microwave drying of the prints. A need also remains for multicolor thermal ink jet printing processes wherein the prints generated exhibit improved waterfastness. In addition, a need remains for multicolor thermal ink jet printing processes wherein the prints generated exhibit improved lightfastness. Further, a need remains for multicolor thermal ink jet printing processes wherein the inks exhibit good latency and maintainability. Additionally, a need remains for multicolor thermal ink jet printing processes wherein the images generate have good to excellent color quality.

SUMMARY OF THE INVENTION

It is an object of the present invention to provide ink jet ink compositions and multicolor thermal ink jet printing processes that will fulfill at least some of the above needs.

It is another object of the present invention to provide ink jet ink compositions with relatively low viscosity and reduced intercolor bleed properties.

It is yet another object of the present invention to provide ink jet ink compositions with high frequency response and reduced intercolor bleed properties.

It is still another object of the present invention to provide antibleed ink jet ink compositions that also exhibit anti-curl properties.

Another object of the present invention is to provide antibleed ink jet ink compositions for multicolor ink jet printing processes with excellent image quality.

Yet another object of the present invention is to provide ink jet ink compositions for multicolor ink jet printing processes with high resolution.

Still another object of the present invention is to provide antibleed ink jet ink compositions that do not clog easily in a printhead or a print element.

It is another object of this invention to provide antibleed ink jet ink compositions that are compatible with colorants used in the inks for multicolor ink jet printing processes.

It is yet another object of the present invention to provide antibleed ink jet ink compositions that can provide high optical density for black and/or color image areas.

It is still another object of the present invention to provide ink jet ink compositions and multicolor ink jet printing processes wherein the prints generated exhibit improved lightfastness and waterfastness.

Another object of the present invention is to provide an ink jet printing process which can provide multicolor images on a print substrate without causing undesired intercolor bleed.

Yet another object of the present invention is to provide a multicolor ink jet printing process which can provide high resolution multicolor images on a print substrate without causing undesired intercolor bleed.

Still another object of the present invention is to provide a fast speed multicolor ink jet printing process which can produce good multicolor ink jet images on a print substrate while avoiding the problems associated with the migration of colorants into each other after printing.

It is another object of the present invention to provide ink jet ink compositions and multicolor ink jet printing processes which can produce good multicolor images on a print substrate at room temperature either with or without heating the print substrate.

It is yet another object of the present invention to provide multicolor ink jet printing processes that can use a drying device, including a radiant heater and/or a microwave dryer for the prints.

It is still another object of the present invention to provide multicolor ink jet printing processes that employ materials, software, and hardware of low cost.

Another object of the present invention is to provide the aforementioned ink jet ink compositions and multicolor ink jet printing processes for the use in various ink jet printing systems including the thermal ink jet printing systems.

Yet another object of the present invention is to provide ink jet ink compositions and multicolor ink jet printing processes wherein the images generated have excellent color quality.

Still another object of the present invention is to provide improved multicolor thermal ink jet printing processes.

It is another object of the present invention to provide multicolor thermal ink jet printing processes wherein the prints generated exhibit reduced intercolor bleed.

It is yet another object of the present invention to provide multicolor thermal ink jet printing processes wherein the prints generated exhibit excellent image quality.

It is still another object of the present invention to provide multicolor thermal ink jet printing processes with rapid printing times.

Another object of the present invention is to provide multicolor thermal ink jet printing processes wherein the prints generated exhibit improved optical density of the black and/or color image areas.

Yet another object of the present invention is to provide multicolor thermal ink jet printing processes which employ materials, software, and hardware of low cost.

Still another object of the present invention is to provide multicolor thermal ink jet printing processes which enable reduced kogation.

It is another object of the present invention to provide multicolor thermal ink jet printing processes which can be used in conjunction with microwave drying of the prints.

It is yet another object of the present invention to provide multicolor thermal ink jet printing processes wherein the prints generated exhibit improved waterfastness.

It is still another object of the present invention to provide multicolor thermal ink jet printing processes wherein the prints generated exhibit improved lightfastness.

Another object of the present invention is to provide multicolor thermal ink jet printing processes wherein the inks exhibit good latency and maintainability.

Yet another object of the present invention is to provide multicolor thermal ink jet printing processes wherein the images generate have good to excellent color quality.

These and other objects of the present invention (or specific embodiments thereof) can be achieved by providing a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink, thereby enabling reduced intercolor bleed.

DETAILED DESCRIPTION OF THE INVENTION

According to the present invention, a first ink is provided which comprises water, an optional humectant, optional additives, and a colorant selected from the group consisting of (1) anionic dyes, (2) dyes stabilized by an anionic stabilizing agent (such as a surfactant or emulsifying agent), (3) pigment particles having anionic groups chemically attached thereto, (4) pigment particles having physically or chemically associated therewith a stabilizing agent (also referred to as a dispersing agent, or a dispersant) having anionic groups (—$CO_2^-$, —$SO_3^-$, or the like) thereon, and (5) mixtures thereof. The color of the first ink is generally preferred to be black, although the color of the first ink can also be any other selected color if so desired.

Further according to the present invention, a second ink comprises water, an optional humectant, optional additives, an optional colorant, and an ammonium salt having at least two cationic ammonium functional groups. Examples of suitable ammonium salts include diquaternary ammonium salts (ammonium salts containing two cationic ammonium moieties), triquaternary ammonium salts (ammonium salts containing three cationic ammonium moieties), and polyquaternary ammonium salts (ammonium salts containing more than three cationic ammonium moieties), as well as any combination thereof with each other and/or with a quaternary ammonium salt containing only one cationic ammonium moiety.

When a diquaternary ammonium salt or triquaternary ammonium salt is selected, each diquaternary ammonium salt comprises two cationic ammonium moieties and their two corresponding anions, and each triquaternary ammonium salt comprises three cationic ammonium moieties and their three corresponding anions, with the total number of carbon atoms being up to about 60. The diquaternary and triquaternary ammonium salts can also comprise any desired number of heteroatoms, such as oxygen, sulfur, nitrogen, selenium, phosphorous, or the like. The diquaternary and triquaternary ammonium salts can, if desired, be substituted with different functional groups, including linear, branched, or cyclic alkyl groups, aromatic groups, and heterocyclic groups, said groups being connected to the cationic ammonium moieties in the molecule. Furthermore, the diquaternary and triquaternary ammonium salts can be substituted with various functional groups, such as hydroxyl groups, ether linkages (—O—), carbonyl groups, carboxylic acid groups, ester groups, amide groups, and the like. The cationic ammonium moieties can reside at any desired positions in the molecule. The diquaternary and triquaternary ammonium salts can be derived from the reaction of an acid (organic or inorganic) or an alkylating agent with either an unsubstituted or a substituted primary, secondary, or tertiary amine, with the diquaternary ammonium salts derived from compounds having two amine groups and the triquaternary ammonium salts derived from compounds having three amine groups. The anions of the diquaternary and triquaternary ammonium salts can be selected from the anions of any organic acid (such as formic acid anion ($HCO_2^-$), acetic acid anion ($CH_3CO_2^-$), propionic acid anion ($CH_3CH_2CO_2^-$), benzoic acid anion ($C_6H_5CO_2$), or the like), inorganic acid (such as hydrochloric acid anion ($Cl^-$), hydrobromic acid anion ($Br^-$), hydroiodic acid anion ($I^-$), nitric acid anion ($NO_3^-$), hydrosulfuric acid anion ($HSO_2^-$), perchloric acid anion ($ClO_4^-$), or the like), or alkylating agent.

Some examples of diquaternary ammonium salts suitable for the present invention include, but are not limited to, ethylenediamine dihydrochloride, ethylenediamine dihydrobromide, ethylenediamine dihydroiodide, ethylenediamine dinitrate, ethylenediamine dihydrosulfate, ethylenediamine diformate, ethylenediamine diacetate, ethylenediamine dipropionate, N-methylethylenediamine dihydrochloride, N-methylethylenediamine dihydrobromide, N-methylethylenediamine dihydroiodide, N-methylethylenediamine dinitrate, N-methylethylenediamine dihydrosulfate, N-methylethylenediamine diformate, N-methylethylenediamine diacetate, N-methylethylenediamine dipropionate, N,N-dimethylethylenediamine dihydrochloride, N,N-dimethylethylenediamine dihydrobromide, N,N-dimethylethylenediamine dihydroiodide, N,N'-dimethylethylenediamine dinitrate, N,N-dimethylethylenediamine dihydrosulfate, N,N-dimethylethylenediamine diformate, N,N-dimethylethylenediamine diacetate, N,N-dimethylethylenediamine dipropionate, N,N'-dimethylethylenediamine dihydrochloride, N,N'-dimethylethylenediamine dihydrobromide, N,N'-dimethylethylenediamine dihydroiodide, N,N'-dimethylethylenediamine dinitrate, N,N'-dimethylethylenediamine dihydrosulfate, N,N'-dimethylethylenediamine diformate, N,N'-dimethylethylenediamine diacetate, N,N'-dimethylethylenediamine dipropionate, N-methyl,N'-ethylethylenediamine dihydrochloride, N-methyl,N'-ethylethylenediamine dihydrobromide, N-methyl,N'-ethylethylenediamine dihydrolodide, N-methy,N'-ethylethylenediamine dinitrate, N-methyl,N'-ethylethylenediamine dihydrosulfate, N-methyl,N'-ethylethylenediamine diformate, N-methyl,N'-ethylethylenediamine diacetate, N-methyl,N'-ethylethylenediamine dipropionate, N,N'-diethylethylenediamine dihydroiodide, N,N'-diethylethylenediamine dinitrate, N,N'-diethylethylenediamine dihydrosulfate, N,N'-diethylethylenediamine diformate, N,N'-diethylethylenediamine diacetate, N,N'-diethylethylenediamine dipropionate, 1,5-diaminopentane dihydrochloride, 1,5-diaminopentane diacetate, 1,4-diaminopiperazine dihydrochloride, 1,4-diaminopiperazine diacetate, 1,6-hexanediamine dihydrochloride, 1,6-hexanediamine dihydrobromide, 1,6-hexanediamine dihydroiodide, 1,6-hexanediamine diformate, 1,6-hexanediamine diacetate, piperazine dihydrochloride, piperazine diacetate, 4-aminopyridine dihydrochloride, 4-aminopyridine diacetate, 4-aminopyridine dihydrobromide, 4-aminopyridine dipropionate, 3-aminopyrrolidine dihydrochloride, 3-aminopyrrolidine dihydrobromide, 3-aminopyrrolidine diacetate, 5-aminoquinuclidine dihydrochloride, 5-aminoquinuclidine dibromide, 5-aminoquinuclidine diacetate, 5-amino-8-hydroxyquinoline dihydrochloride, 5-amino-8-hydroxyquinoline dihydrobromide, 5-amino-8-hydroxyquinoline diacetate, 1,4-diaminocyclohexane dihydrochloride, 1,4-diaminocyclohexane diacetate, 1,4-diaminobenzene dihydrochloride, 1,4-diaminobenzene diacetate, 1,2-diaminobenzene dihydrochloride, 1,2-diaminobenzene diacetate, 1,3-diaminobenzene dihydrochloride, 1,3-diaminobenzene diacetate, hexamethonium chloride, hexamethonium bromide, dihydrochloride salt of diaminoethyl ether of polyethyleneglycol, dihydrobromide salt of diaminoethyl ether of polyethyleneglycol, dihydroiodide salt of diaminoethyl ether of polyethyleneglycol, dinitrate salt of diaminoethyl ether of polyethyleneglycol, diacetate salt of diaminoethyl ether of polyethyleneglycol, dihydrochloride salt of diaminoethyl ether of polypropyleneglycol, dihydrobromide salt of diaminoethyl ether of polypropyleneglycol, dihydroiodide salt of diaminoethyl ether of polypropyleneglycol, dinitrate salt of diaminoethyl ether of polypropyleneglycol, diacetate salt of diaminoethyl ether of polypropyleneglycol, and the like; isomers thereof; and mixtures thereof.

Some examples of triquaternary ammonium salts suitable for the present invention include, but are not limited to, N,N,N',N',N"-pentamethyldiethylenetriamine trihydrochloride, N,N,N',N',N"-pentamethyldiethylenetriamine trihydrobromide, N,N,N',N',N"-pentamethyldiethylenetriamine trihydroiodide, N,N,N',N',N"-pentamethyldiethylenetriamine triformate, N,N,N',N',N"-pentamethyidiethylenetriamine triacetate, 1,3,5-triazine trihydrochloride, 1,3,5-triazine trihydrobromide, 1,3,5-triazine trihydroiodide, 1,3,Striazine triformate, 1,3,5-triazine triacetate, 1,3,5-triazine tripropionate, 1,4,7-triazacyclononane trihydrochloride, 1,4,7-triazacyclononane trihydrobromide, 1,4,7-triazacyclononane trihydroiodide, 1,4,7-triazacyclononane triformate, 1,4,7-triazacyclononane triacetate, 1,4,7-triazacyclononane tripropionate, 1,2,4,-triazole trihydrochloride, 1,2,4,-triazole trihydrobromide, 1,2,4,-triazole trihydroiodide, 1,2,4,-triazole triformate, 1,2,4,-triazole triacetate, 1,2,4,-triazole tripropionate, glycerol tris ((poly(propylene glycol), amine terminated) ether trihydrochloride, glycerol tris((polypropylene glycol), amine terminated) ether trihydrobromide, glycerol tris ((polypropylene glycol), amine terminated) ether trihydrolodide, glycerol tris((polypropylene glycol), amine terminated) ether triformate, glycerol tris((polypropylene glycol), amine terminated) ether triacetate, glycerol tris ((polypropylene glycol), amine terminated) ether tripropionate, glycerol tris((polyethylene glycol), amine terminated) ether trihydrochloride, glycerol tris ((polyethylene glycol), amine terminated) ether trihydrobromide, glycerol tris((polyethylene glycol), amine terminated) ether trihydroiodide, glycerol tris((polyethylene glycol), amine terminated) ether triformate, glycerol tris ((polyethylene glycol), amine terminated) ether triacetate, glycerol tris((polyethylene glycol), amine terminated) ether tripropionate, and the like, as well as mixtures thereof.

The diquaternary and triquaternary ammonium salts can also comprise mixed anions and different functional groups in a molecule.

Polyquaternary ammonium salts suitable for the present invention are materials, including polymers and copolymers, having more than three cationic quaternary ammonium moieties and their corresponding anions per molecule. Like the diquaternary and triquaternary ammonium salts, the polyquaternary ammonium salts can be prepared by reacting polyamine derivatives with organic or inorganic acids or alkylating agents. The polyamine derivatives can be substituted (including nitrogen substituted amines, or N,N-disubstituted amines) or unsubstituted amines. The reaction products of polyamine derivatives and an organic or inorganic acid comprise at least a cationic ammonium moiety in which at least one hydrogen atom (from an acid) is attached to the nitrogen atom in a polyquaternary ammonium salt molecule. If an alkylating agent is used in generating one or more ammonium salt moieties, then at least an alkyl group (from an alkylating agent) is attached to one of the nitrogen atoms in the polyquaternary ammonium salt molecule. The organic acids and inorganic acids suitable for the preparation of polyquaternary ammonium salts are similar to those mentioned hereinabove for the diquaternary and triquaternary ammonium salts. The polyquaternary ammonium salts can be alkyl (linear or branched), cyclic, aromatic, and/or hetercyclic, and can include any desired number of heteroatoms, such as oxygen, sulfur, nitrogen, selenium, phosphorous, or the like. The polyquaternary ammonium salts can be substituted with various functional groups, such as hydroxyl groups, ether linkages (—O—), carbonyl groups, carboxylic acid groups, ester groups, amide groups, and the like. The polyquaternary ammonium salts suitable for the present invention can also be cationic ammonium salts of copolymers or homopolymers. The average molecular weight of the polyquaternary ammonium salts can be as high as about 1 million, although the molecular weight preferably is less than about 10,000.

Some examples of polyquaternary ammonium salts suitable for the present invention include, but are not limited to, poly(allylamine hydrochloride), poly(allylamine hydrobromide), poly(allylamine acetate), poly(diallyidimethylammonium chloride), poly(diallyldimethylammonium bromide), poly(diallylmethylammonium acetate), poly(4-vinylpyridine hydrochloride), poly(4-vinylpyridine hydrobromide), poly(4-vinylpyridine acetate), polyamine salts of organic and inorganic acids, polyethyleneimine salts of organic and inorganic acids, alkylpolyethyleneimine salts of organic and inorganic acids, hydroxyethylated polyethyleneimine salts of organic and inorganic acids, polyvinylpyridinium salts of organic and inorganic acids, polyalkylpyridinium salts of organic and inorganic acids, polvinylybenzyl ammonium salts of organic and inorganic acids, and the like, as well as mixtures thereof.

The polyquaternary ammonium salts can also comprise mixed anions and different functional groups in a molecule.

The second ink composition contains the di-, tri-, or polyquaternary ammonium salt in any desired or effective amount to enable it to react or complex with the colorant and/or colorant stabilizing agent in the first ink composition, thereby causing immobilization or precipitation of the colorant and/or colorant stabilizing agent on the print substrate and resulting in the reduction of intercolor bleed and the improvement of image quality. Typically, the ammonium salt having at least two cationic ammonium functional groups per molecule is present in the ink in an amount of from about 0.001 to about 15 percent by weight of the ink, preferably from about 0.01 to about 15 percent by weight of the ink, more preferably from about 0.1 to about 10 percent by weight of the ink, and even more preferably from about 0.1 to about 8 percent by weight of the ink, although the amount can be outside of these ranges.

The di-, tri-, and polyquaternary ammonium salts can also be used in conjunction with one or more monoquaternary ammonium salts in any combination. The monoquaternary ammonium salts have one cationic quaternary ammonium moiety and a corresponding anion in each ammonium salt molecule. The monoquaternary ammonium salts are prepared from an amine (including primary amines, secondary amines, and tertiary amines) and an alkylating agent or an organic or inorganic acid. Monoquaternary ammonium salts, however, are less effective than diquaternary ammonium salts, triquaternary ammonium salts, and polyquaternary ammonium salts for reducing intercolor bleed. The diquaternary ammonium salts, triquaternary ammonium salts, polyquaternary ammonium salts, and mixtures thereof with monoquaternary ammonium salts are capable of forming cations and anions in an aqueous ink medium. Ammonium cations with more than two ammonium groups are effective in immobilizing or reacting or complexing the colorants in the inks employed in the present invention. If desired, the aforementioned di-, tri-, and polyquaternary ammonium salts can also be used in conjunction with any known multivalent metal salts (organic and inorganic salts comprising metal cations, including $Ca^{++}$, $Zn^{++}$, $Mg^{++}$, $Cu^{2+}$, $Sr^{++}$, $Ba^{++}$, $Al^{+++}$, transition metal cations such as $Ga^{3+}$, $In^{3+}$, $Cr^{3+}$, $Fe^{+++}$, $Sn^{++++}$, or the like, lanthanide metal cations, such as $Pr^{3+}$, $Nd^{3+}$, $Y^{3+}$, or the like) in the second ink for the present invention to reduce intercolor bleed further and to improve print quality and jetting performance.

The ink compositions for the present invention also contain water, a colorant, one or more optional humectants, and one or more optional additives such as cosolvents and/or other optional additives known in the art of ink jet inks. Many useful known humectants and/or cosolvents are suitable for use in the inks for the present invention. Some suitable humectants and cosolvents include, but are not limited to, glycol derivatives, such as ethylene glycol, diethylene glycol, propylene glycol, dipropylene glycol, polyethylene glycol, polypropylene glycol, poly(ethylene-co-propylene) glycol, and the like, as well as their reaction products with alkylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like, as well as their reaction products with alkylene oxides, including ethylene oxide, propylene oxide, and mixtures thereof; diols containing from about 2 to about 40 carbon atoms, such as 1,3-pentanediol, 1,4-butanediol, 1,5-pentanediol, 1,4-petanediol, 1,6-hexanediol, 1,5-hexanediol, 2,6-hexanediol, neopentylglycol (2,2-dimethyl-1,3-propanediol), and the like, as well as their reaction products with alkylene oxides, including ethylene oxide and propylene oxide in any desirable molar ratio to form materials with a wide range of molecular weights; sulfoxide derivatives containing from about 2 to about 40 carbon atoms, including dialkylsulfoxides (symmetric and asymmetric sulfoxides) such as dimethylsulfoxide, methylethylsulfoxide, alkylphenyl sulfoxides, and the like; sulfone derivatives (symmetric and asymmetric sulfones) containing from about 2 to about 40 carbon atoms, such as dimethysulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, dipropylsulfone, propylbutylsulfone, dibutylsulfone, methylphenylsulfone, methylsulfolane, dimethylsulfolane, and the like; amides with from about 2 to about 40 carbon atoms, such as N-alkylamides, N,N-dialkyl amides, N,N-alkyl phenyl amides, 2-pyrrolidinone (a cyclic amide), N-methylpyrrolidinone (a cyclic amide), N-cyclohexylpyrrolidinone, N,N-dimethyl-p-toluamide (aromatic), N,N-dimethyl-o-toluamide, N,N-diethyl-m-toluamide, and the like; ethers, such as alkyl ether derivatives of various alcohols, ether derivatives of triols and diols, including butylcarbitol, hexylcarbitol, triolethers, alkyl ethers of polyethyleneglycols, alkyl ethers of polypropyleneglycols, alkyl ethers of phenylpolyethyleneglycols, alkyl ethers of phenylpolypropyleneglycols, and the like; urea and urea derivatives; inner salts such as betaine, and the like; thio (sulfur) derivatives of the aforementioned materials (humectants), including thioethyleneglycol, thiodiethyleneglycol, trithio- or dithio-diethyleneglycol, and the like; hydroxyamide derivatives, including acetylethanolamine, acetylpropanolamine, propylcarboxy-ethanolamine, propylcarboxy-propanolamine, and the like; reaction products of aforementioned materials (humectants) with alkylene oxides; and mixtures thereof.

Further examples of suitable humectants are disclosed in, for example, U.S. Pat. No. 5,281,261, U.S. Pat. No. 5,531,818, U.S. Pat. No. 5,693,129, U.S. Pat. No. 4,840,674, U.S. Pat. No. 5,356,464, copending application U.S. Ser. No. 08/782,237, and copending application U.S. Ser. No. 08/876,41, the disclosures of each of which are totally incorporated herein by reference. For example, U.S. Pat. No. 5,693,129 discloses the use of hydroxyamide derivatives, mercaptoamide derivatives, hydroxythioamide derivatives, mercaptothioamide derivatives, and oxyalkylene (alkyleneoxide) reaction products of the above said derivatives as anticurl agents for ink jet ink compositions. These materials and other known anti-curl agents, including those disclosed in, for example, U.S. Pat. No. 5,356,464 can be employed in the inks for the present invention to provide both anticurl and antibleed properties for the production of multicolor images. Furthermore, ink compositions for the present invention further comprising some of the materials disclosed in U.S. Pat. No. 5,693,129 and copending application U.S. Ser. No. 08/782,237 can be used in a high resolution ink jet printing process to provide long ink latency and high frequency response. The inks for the present invention, in some embodiments, will have a reduced tendency to clog the printhead nozzles and less frequency of ink spitting and printhead wiping. Furthermore, the ink compositions for the present invention can be used with regular printheads, partitioned printheads, partial width printheads, and full width array printheads in ink jet printing processes. The ability of the ink compositions for the present invention to be jetted at high frequency (because of high frequency response, typically 4 KiloHertz or greater) allows one to print multicolor ink jet images at high speed, especially when full width array ink jet printheads are used. A printing speed of 50 copies per minutes for the production of multicolor images can be achieved.

Humectants, if present, are in the ink in any desired or effective amount, typically up to about 40 percent by weight of the ink, preferably up to about 35 percent by weight of the ink, and more preferably from about 5 to about 30 percent by weight of the ink, although the amount can be outside of these ranges.

Ink compositions for the present invention can also be prepared with low viscosity. Low molecular weight materials are preferred in the inks. Diquaternary ammonium salts are preferred for this purpose. Some examples of additional useful ink ingredients are disclosed in, for example, U.S. Pat. No. 5,281,261, U.S. Pat. No. 5,531,818, and U.S. Pat. No. 5,693,129, the disclosures of each of which are totally incorporated herein by reference. Ink compositions for the present invention with low viscosity can allow fast ink jetting and refill in multicolor ink jet printing processes of the present invention. The viscosity of the ink composition is usually less than about 10 centipoise (at room temperature, i.e., about 25° C.), preferably from about 1 to about 6 centipoise, and more preferably from about 1 to about 5 centipoise.

The ink compositions for the present invention can also comprise additional additives, such as a penetrant to minimize intercolor bleeding and drying time. The penetrant can impart to the ink, especially a color ink, a low surface tension, preferably less than about 45 dynes per centimeter, more preferably from about 20 to about 45 dynes per centimeter, and even more preferably from about 25 to about 45 dynes per centimeter.

Penetrants include, but are not limited to, hydroxyethers (Cellusolve® and Alkylcellusolves®, Carbitol® and Alkylcarbitols® such as Propylcarbitol®, Butylcarbitol®, Pentylcarbitol®, Hexylcarbitol®, and the like); alkylethers of glycol derivatives, including alkylethers of ethyleneglycol, diethyleneglycol, triethyleneglycol, tetraethyleneglycol, dipropyleneglycol, tripropyleneglycol, and tetra-propyleneglycol; polyethyleneglycol ether derivatives, such as methyl, ethyl, propyl, butyl, pentyl, hexyl, phenyl, and alkylphenyl ether derivatives of polyethyleneglycols; polypropyleneglycol ether derivatives, such as methyl, ethyl, propyl, butyl, pentyl, hexyl, phenyl, and alkylphenyl ether derivatives of polypropyleneglycols; amide derivatives, including N-methylpyrrolidinone, N,N-dimethyl-p-toluamide, N,N-dimethyl-o-toluamide, N,N-diethyl-m-toluamide, and the like; surfactants, including nonionic and ionic materials with low surface tension (typically 45 dynes per centimeter or less at room temperature); and the like, as well as mixtures thereof. The aforementioned additives can be used in the inks for the present invention to give ink jet ink compositions with additional advantages in the reduction of intercolor bleed and drying time. The use of the aforementioned penetrants and/or surfactants is particularly useful for color ink compositions used in a multicolor ink jet printing process. Use of these penetrants and/or surfactants can allow significant reduction of intercolor bleed between the black and color inks as well as between two different color inks. However, if desired, the aforementioned materials can also be used in black ink jet ink compositions, provided that they are compatible with the colorants in the inks.

The colorants used in the ink compositions for the present invention can be selected from dyes, pigments, and mixtures thereof. The colorant can be selected from the suitable colorants listed in the *Color Index*, published jointly by American Association of Textile Chemist and Colorists (AATCC) and The Society of Dyers and Colorists in Bradford, England; *BUYER'S GUIDE for Textile Chemist and Colorist*, published by AATCC, and the like. The colorant can be present in the inks either with or without a dispersing agent. For example, pigment particles such as those modified chemically to possess ionizable functional groups in water, such as carboxylate or sulfonate groups, are table in an aqueous ink and do not require a dispersing agent. Some examples of chemically modified pigments are disclosed in, for example, U.S. Pat. No. 5,281,261, the disclosure of which is totally incorporated herein by reference; also suitable are commercial carbon black dispersions such as Cabojet 200, Cabojet 300, and the like. Pigment particles which are not chemically modified preferably are present with at least a dispersing agent (or dispersant) to stabilize the particles in an aqueous ink. The pigment stabilizing agent can be anionic, cationic, or nonionic. Anionic pigment stabilizing agents, however, are preferred in the first ink (i.e., the ink not containing the di-, tri-, or polyquaternary ammonium salt) because of their ability to react with or form complexes with or immobilize the di-, tri-, or polyquaternary ammonium salt in the second ink.

In embodiments of the present invention wherein dyes are used, the dye is present in the ink in any effective amount to provide desired color and optical density. Typically, the dye is present in an amount from about 0.1 to about 15 percent by weight of the ink, preferably from about 1 to about 10 percent by weight of the ink, more preferably from about 1 to about 8 percent by weight of the ink, and even more preferably from about 1 to about 7 percent by weight of the ink, although the amount can be outside of this range. A mixture of dyes in any desired proportion can also be employed to obtain a specific shade or hue. Similarly, in embodiments of the present invention where pigment is used, the pigment can be present in the ink in any effective amount. Typically the pigment is present in an amount of from about 0.1 to about 15 percent by weight of the ink, and preferably from about 1 to about 10 percent by weight of the ink, although the amount can be outside of these ranges. When both dyes and pigments are incorporated into an ink, the weight percentage of the combined colorant can be adjusted accordingly.

Any suitable dye or mixture of dyes that is compatible with the other ink ingredients can be used. Water soluble or water dispersible anionic dyes, direct dyes, reactive dyes, and cationic dyes can be selected. Examples of suitable dyes include, but are not limited to, Food dyes such as Food Black No.1, Food Black No.2, Food Red No. 40, Food Blue No. 1, Food Yellow No. 7, and the like; FD & C dyes; Acid Black dyes (No. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like); Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 236, and the like); Direct Yellow dyes (No. 4, 11, 12, 27, 28, 33, 34, 39, 50, 58, 86, 100, 106, 107, 118, 127, 132, 142, 157, and the like); anthraquinone dyes; monoazo dyes; disazo dyes; phthalocyanine derivatives, including various phthalocyanine sulfonate salts; aza (18) annulenes; Formazan copper complexes; triphenodioxazines; Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI of America (Zeneca Co.); Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X34, available from BASF; Carta Black 2GT, available from Sandoz, Inc.; Neozapon Red 492, available from BASF; Orasol Red G available from Ciba-Geigy; Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor Acid Yellow 34; Telon Fast Yellow 4GL-175; BASF Basacid Black SE 0228; the Pro-Jet® series of dyes available from Zeneca Co., including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), and Pro-Jet® waterfast dyes; Aminyl Brilliant Red F-B, available from Sumitomo Chemical Company (Japan); the Duasyn® line of "salt-free" dyes available from Hoechst/Celanese, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), and Duasyn® Acid Blue AE-SF VP344 (Acid Blue 9); various Reactive dyes, including Reactive Black dyes, Reactive Blue dyes, Reactive Red dyes, and Reactive Yellow dyes; and the like; as well as mixtures thereof.

Pigments can be of any desired color, such as black, cyan, magenta, yellow, red, blue, green, brown, or the like, as well as mixtures thereof. It is preferred that the pigment particles in an ink jet ink composition have the same or similar color so there is no interference or impairment of the desired color of the final ink. Examples of suitable pigments in the ink jet ink compositions include, but are not limited to, various carbon blacks such as channel blacks; furnace blacks; lamp blacks; Raven® carbon blacks including Raven® 5250, Raven® 5750, Raven® 3500 and other similar carbon black products available from Columbia Company; carbon blacks including Regal® 330, Black Pearl® L, Black Pearl® 1300, and other similar carbon black products available from Cabot Corporation; Degussa carbon blacks such as Color Black® series, Special Black® series, Printtex® series and Derussol® carbon black dispersions available from Degussa Company; Cabojet® series carbon black dispersions including Cabot IJX 56 carbon black dispersion, Cabojet® 200, Cabojet® 300, and the like from Cabot corporation; Lavanyl® carbon black dispersions from Bayer Company, Special Black® carbon black dispersions from BASF Co.; Hostafine® series pigment dispersions such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7, carbon black), and Hostaflne® Black TS (Pigment Black 7), available from Hoechst/Celanese Corporation; Normandy Magenta RD-2400 (Paul Uhlich); Paliogen Violet 5100 (BASF); Paliogen® Violet 5890 (BASF) Permanent Violet VT2645 (Paul Uhlich); Heliogen Green L8730 (BASF); Argyle Green XP-111-S (Paul Uhlich); Brilliant Green Toner GR 0991 (Paul Uhlich); Heliogen® Blue L6900; L7020 (BASF), Heliogen® Blue D6840, D7080 (BASF); Sudan Blue OS (BASF); PV Fast Blue B2G01 (Hoechst/Celanese); Irgalite Blue BCA (Ciba-Geigy); Paliogen® Blue 6470 (BASF); Sudan III (Matheson, Coleman, Bell); Sudan II (Matheson, Coleman, Bell); Sudan IV (Matheson, Coleman, Bell); Sudan Orange G (Aldrich); Sudan Orange 220 (BASF); Paliogen® Orange 3040 (BASF); Ortho Orange OR 2673 (Paul Uhlich); Paliogen® Yellow 152, 1560 (BASF); Lithol Fast Yellow 0991 K (BASF); Paliotol Yellow 1840 (BASF); Novoperm® Yellow FG 1 (Hoechst/Celanese); Permanent Yellow YE 0305 (Paul Uhlich); Lumogen Yellow D0790 (BASF); Suco-Gelb L1250 (BASF); Suco-Yellow D1355 (BASF); Hostaperm® Pink E (Hoechst/Celanese), Fanal Pink D4830 (BASF); Cinquasia Magenta (DuPont); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen® Red 3871 K (BASF); Paliogen® Red 3340 (BASF); Lithol Fast Scarlet L4300 (BASF); and mixtures thereof. Many useful pigments can also be found in the *Color Index,* published jointly by American Association of Textile Chemist and Colorists (AATCC) and The Society of Dyers and Colorists in Bradford, England.

The optional colorant of the second ink should be compatible with the selected di-, tri-, or polyquaternary ammonium salt in the second ink jet ink composition to avoid any jetting and/or stability problems. More specifically, the selected colorant in the second ink should not be precipitated by the selected di-, tri-, or polyquaternary ammonium salt.

Preferably, the pigment particle size is as small as possible to enable a stable colloidal suspension of the particles in the liquid vehicle with good color strength, and to prevent clogging of the ink channels or nozzle openings when the ink is used in an ink jet printer. Preferred average particle sizes or diameters are generally from about 0.001 to about 3 microns, although the particle sizes can be outside of these ranges. A more preferred pigment particle size distribution is one wherein particles having at least 50 percent of the particles being below 0.3 micron, with no particles being greater than 3.0 microns (measured on a Hodaka CAPA 700 Particle Size Analyzer). More preferably, the average pigment particle size includes particles having at least 70 percent of the particles being below 0.3 micron, with no particles being greater than 1.2 microns. Pigment particle sizes can, however, be outside of these ranges provided that they do not cause undesired clogging and maintenance problems.

In some embodiments of the present invention, the dye or pigment can be dispersed in the ink with one or more dispersants or stabilizing agents. The stabilizing agents can be anionic, cationic, or nonionic. Some stabilizing agents have both hydrophilic (comprising ionic groups which are capable of ionizing in water) and hydrophobic (affinity for pigments) moieties. Suitable stabilizing agents include, but are not limited to, anionic dispersants, such as polymers and copolymers of styrene sulfonate salts (such as $Na^+$, $Li^+$, $K^+$, $Cs^+$, $Rb^+$, substituted and unsubstituted ammonium cations, and the like), unsubstituted and substituted (such as alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) with an aldehyde derivative, such as unsubstituted alkyl aldehyde derivatives, including formaldehyde, acetaldehyde, propylaldehyde, and the like, as well as mixtures thereof. Examples of such stabilizing agents include, but are not limited to, commercial products such as Versa® 4, Versa® 7, Versa® 77 (National Starch and Chemical Co.); Lomar® D (Diamond Shamrock Chemical Co.); Daxad® 19, Daxad® K (W.R. Grace & Co.); Tamol® SN (Rohm & Haas); and the like. Other useful anionic stabilizing agents include polymers or copolymers of styrene and an acrylic acid salt, styrene and a methacrylic acid salt, styrene and a maleic acid salt, and the like, as well as mixtures thereof.

Nonionic stabilizing agents or surfactants can also be used in inks for the present invention, such as ethoxylated monoalkyl or dialkyl phenols, including Igepal® CA and CO series materials (Rhone-Poulenc Co., such as Igepal® CA-630, CO-630, and the like); Surfynol® series materials from Air Products and Chemicals Co.; and Triton® series materials (Union Carbide Company). These nonionic surfactants or dispersants can be used alone or in combination with anionic or cationic dispersants.

The ratio of dye or pigment to stabilizing agent by weight typically is from about 1:0.01 to about 1:3, preferably from about 1:0.1 to about 1:2, and more preferably from about 1:0.10 to about 1:0.75.

The ratio of naphthalene substituent to aldehyde in the aforementioned anionic stabilizing agents typically is about 1:1, although this ratio can be different depending on the stoichiometry of the feed stock and reaction condition, and can readily be adjusted to obtain a dispersant having a desired molecular weight and the desired ratio of naphthalene substituent to aldehyde. The weight average molecular weight of the stabilizing agent is generally less than about 20,000, preferably less than about 13,000, and more preferably less than about 10,000. The dispersion preferably contains enough dispersant to stabilize the dye or pigment particles in water, but not so much as to affect adversely properties of the dispersion and ink such as viscosity, stability, and optical density.

The ink compositions for the present invention, particularly dye-based inks, can optionally include a water soluble or miscible microwave coupler. The microwave coupler can be selected from any one of the known microwave couplers, which can be organic or inorganic salts or nonionic microwave coupling agents that allow an ink to be dried quickly by a microwave heating device. The ionic type of microwave coupler can be selected from organic or inorganic salts that allow the ink to be dried quickly by a microwave-heating device. The microwave coupler can be, for example, a salt that provides the ink with a desirable conductivity and coupling efficiency. The salts or ionic compounds exhibit a high degree of ionization in aqueous inks with good electrical conductivity and are capable of coupling with a microwave device for drying ink on a print substrate and avoiding intercolor bleed when the inks are printed next to, for example, a pigment based ink which is stabilized by an anionic dispersant. Those ionic compounds typically include metal and ammonium salts of inorganic and organic acids with cations and anions. Typical cations of salts include, but are not limited to, $H^+$, $NH_4^+$, $Cs^+$, $K^+$, $Na^+$, $Li^+$, $Ca^{2+}$, $Mg^{2+}$, $Zn^{2+}$, $Ni^{2+}$, $Mn^{2+}$, $Co^{2+}$, $Sr^{2+}$, $Cd^{2+}$, $Ba^{2+}$, $Fe^{2+}$, $Cu^{2+}$, $Ga^{3+}$, $In^{3+}$, $Cr^{3+}$, $Pr^{3+}$, $Nd^{3+}$, $Y^{3+}$, $Al^{3+}$, $Fe^{3+}$, lanthanide cations, actinide cations, and the like. The anions of the salts include, but are not limited to, halides ($I^-$, $Br^-$, $Cl^-$, and $F$), chlorate ($ClO_3^-$), $OH^-$, $NO_3^-$, $SO_4^{2-}$, $CH_3CO_2^-$, $CH_3CH_2CO_2^-$, $C_6H_5CO_2^-$, $C_6H_5SO_3^-$, various ethylene diamine tetraacetic acid (EDTA) anions, and the like. Metal salts of monovalent and multivalent salts can also be used in inks for the present invention for the reduction of intercolor bleed, either through microwave heating of the images or through chemical interaction with anionic colorants in the presence or absence of heat in a multicolor ink jet printing process. The di-, tri-, and polyquaternary ammonium salts contained in the inks for the present invention can be used in conjunction with metal salts to form ionized species easily in an aqueous medium. They are capable of coupling effectively with microwaves to generate heat for the reduction of intercolor bleed and the increase of ink drying efficiency and rate. Thus, the inks for the present invention can have reduced intercolor bleed performance with faster drying rates and printing speeds if a microwave device is employed in the multicolor ink jet printing process. The di-, tri-, and polyquaternary ammonium salts can also be used in conjunction with multivalent metal salts in inks to increase further the efficiency of antibleed performance, either with or without a microwave device.

The inks for the present invention can optionally include a jetting aid such as polyethylene oxide (typically in amounts of less than about 5 percent by weight) or a small quantity (typically less than about 0.1 percent by weight) of stabilized pigment particles. A preferred polyethylene oxide is one having a weight average molecular weight of about 18,500, although the molecular weight of the jetting aid can be different. Examples of inks containing preferred polyethylene oxides are disclosed in, for example, U.S. Pat. No. 5,207,825, the disclosure of which is totally incorporated herein by reference. The jetting aid provides smooth jetting or jetting with low jitter, and is particularly useful in dye-based inks. If necessary, jetting aids can also be used in pigment-based ink jet inks.

Other desired additives, including water soluble polymers, pH buffering agents, biocides, chelating agents (EDTA and the like), anticurl agents, antibleed agents, and other known ink additives can also optionally be used in the inks for the present invention. Such additives can generally be added to the inks in known amounts for their known purposes.

Additives such as surfactants or wetting agents can also be added to the inks. These additives can be of the anionic or nonionic types. Suitable surfactants and wetting agents include, but are not limited to, Tamol SN®, Tamol LG®, and Triton® series (Rohm and Haas Co.); Marasperse® series; Igepal® series (Rhone-Poulenc Co., formerly from GAF Co.); Tergitol® series; Duponol® series (E.I. Du Pont de Nemours & Co.); Surfynol Series (Air Products Inc.); Iconol® Series (BASF Co.); Brij® Series (ICI Americas Inc.); Pluronic® Series (BASF Co.); Emulphor®) ON 870 and ON 877 (GAF); and other commercially available surfactants. These surfactants (or dispersants) and wetting agents can be present in the ink in effective amounts, generally from 0 to about 15 percent by weight of the ink, preferably from about 0.001 to about 10 percent by weight of the ink, and more preferably from about 0.01 to about 8 percent by weight of the ink, although the amount can be outside of these ranges.

Polymeric additives can also be added to the inks for the present invention to enhance the viscosity or smear resistance of the ink. Suitable polymeric additives include, but are not limited to, water soluble polymers and copolymers such as Gum Arabic, polyacrylate salts, polymethacrylate salts, polyvinyl alcohols, hydroxypropylcellulose, hydroxyethylcellulose, polyvinylpyrrolidinone, polyvinylether, starch, polysaccharides, polyethyleneimines derivatized with ethylene oxide and/or propylene oxide, such as the Discole® series (DKS International); the Jeffamine® series (Texaco); and the like as well as mixtures thereof. Polymeric additives can be present in the ink in amounts of from 0 to about 10 percent by weight of the ink, preferably from about 0.001 to about 8 percent by weight of the ink, and more preferably from about 0.001 to about 5 percent by weight of the ink, although the amount can be outside of these ranges.

Other optional additives include, but are not limited to, biocides such as Dowicil® 150, 200, and 75, benzoate salts, sorbate salts, Proxcel® (available from ICI), and the like. When used, such biocides are generally present in an amount of from 0 to about 10 percent by weight of the ink, preferably from about 0.001 to about 8 percent by weight of the ink, and more preferably from about 0.01 to about 4.0 percent by weight of the ink, although the amount can be outside of these ranges. Inks for the present invention can also include pH controlling (buffering) agents. Suitable pH controlling agents or buffering agents include, but are not limited to, acids, bases, phosphate salts, carboxylate salts, sulfite salts, sulfate salts, amine salts, and the like. Such pH controlling agents are generally present in an amount of from 0 to about 10 percent by weight of the ink, preferably from about 0.001 to about 5 percent by weight of the ink, and more preferably from about 0.01 to about 5 percent by weight of the ink, although the amount can be outside of these ranges.

The inks for the present invention in some embodiments also exhibit good latency and high frequency response. Some examples of the inks for the present invention have shown latency data of about 10 seconds or more at a relative humidity of 15 percent when a high resolution 600 spi printhead is employed. Maximum frequency response of at least 5 to 12 KiloHertz was observed when the inks were used in a high resolution printhead of 600 spi. Since the inks for the present invention frequently have low viscosity (5 centipoise or less), they can also be used in ink jet printheads with resolutions of 600 to 720 spi, allowing printing with a resolution of up to 1440 spi. If full width array printheads are used, a printing speed of 50 pages per minute or more can be achieved. Thus, inks for the present invention can be used to produce multicolor images at a very high speed. If desired, the inks can also be printed at any speed lower than 50 pages per minute using proper electronic control and printheads selected from single printheads, partial-width printheads, full width array printheads, and combinations thereof.

The inks for the present invention can be applied to a print substrate, either with or without being heated by a heating device, in an imagewise fashion according to digital data signals. Application of the inks onto the substrate can also be made by any other suitable printing process compatible with aqueous inks, including flexographic printing, pen plotters, continuous stream ink jet printing systems, drop-on-demand ink jet printing systems (including piezoelectric, acoustic, and thermal ink jet printing processes), and the like.

The print substrate employed can be any substrate compatible with aqueous inks. Suitable substrates include, but are not limited to, textiles; plain papers, such as Xerox® series 10, Xerox® 4024, Strathmore Legacy, Ampad Premium grade, Hammermill Jet Print, GP Microprint, Weyerhaeuser Jet-Xtra, Boise Cascade, Union Camp Great White Recycled, commercial bond papers and the like; coated papers (or special ink jet papers including photo-realistic ink jet papers) such as those available from Hewlett-Packard, Canon, Eastman Kodak, Oji Paper, 3M, Mitsubishi, Polaroid, and Xerox; ink jet transparencies suitable for aqueous inks or ink jet printing processes, including those from Arkwright, Hewlett-Packard, Canon, Asahi, and Xerox; and the like, as well as materials from other commercial sources.

In multicolor ink jet printing processes of the present invention, the inks can be printed on a print substrate in a single pass or a multiple pass method, by a single printhead, or a partial width printhead, or a full width array printhead, or combinations thereof, in an imagewise manner according to digital data signals. In a multicolor ink jet printing process, the print substrate and imaged inks can optionally be dried either with or without heat at any stage of the printing process, including before, during, and after printing, as well as combinations thereof. Heat can be applied by a microwave dryer or device. In addition to microwave heating, the print substrate and the ink jet ink compositions can be dried at any stage of the multicolor ink jet printing process by means such as a radiant heater, a hot plate, a hot roller or drum, a heating element, a lamp, or the like. The drying of the print substrate and inks further improves print quality and increases printing speed.

In another embodiment, the second ink, containing the di-, tri-, or polyquaternary ammonium salt, contains no colorant. In this instance, two or more inks with colorants can be used (for example, clear, black, cyan, magenta, and yellow inks) in a multicolor ink jet printing processes of the present invention. The clear liquid can be used to print on a print substrate in the region between two different inks. The clear second ink comprises a di-, tri-, or polyquaternary ammonium salt which can react with or complex with or otherwise immobilize the colorant in the first ink, thereby preventing the colorant from invading into the neighboring color imaging area of the third ink, resulting in reduction of intercolor bleed. Any desired number of pixels of the second ink can be printed between the first and third inks. This multicolor ink jet printing process employing a clear liquid in the second ink has an advantage in that there is no incompatibility between the selected di-, tri-, or polyquaternary ammonium salt and a colorant in the second ink.

If desired, the second ink comprising the di-, tri-, or polyquaternary ammonium salt can also be printed under or above the first ink on a substrate in any desired sequences or patterns, such as 1/16 tone, 1/8 tone, 1/4 tone, 1/2 tone, 3/4 tone, 4/4 (full tone), or the like, to enhance optical density, image quality, color fidelity, waterfastness, and lightfastness. These image improvements can be achieved by the desired reaction or complexation between the di-, tri-, or polyquaternary ammonium salt of the second ink and the colorant of the first ink.

The multicolor ink jet printing process of the present invention can have any desired ink printing sequence in any combination as long as the purpose or the need of the present invention is fulfilled. It is, however, preferred to print the black ink as far apart as possible from the printing of the yellow ink to minimize intercolor bleed between the black and yellow inks. Accordingly, preferred sequences are K(black) C(cyan) M(magenta) Y(yellow); KMCY; YMCK; and YCMK.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A yellow ink composition was prepared by simple mixing of the ingredients which contained 2.72 percent by weight Acid Yellow 23 dye (Hoechst Celanese Co.), 2.91 percent by weight diethylene glycol, 2.91 percent by weight 2-pyrrolidinone, 9.70 percent by weight N-acetylethanolamine, 1.94 percent by weight butyl carbitol, 0.097 percent by weight Brij 30 surfactant, 0.049 percent by weight polyethylene oxide (bisphenol-A derivative, molecular weight 18,500, obtained from Polysciences Corp.), 2.43 percent by weight ethylenediamine dihydrochloride, and distilled water (balance). To the resulting ink was added 0.5 molar potassium hydroxide until the pH of the ink was 6.85, followed by filtering the ink through 5.0 micron, 1.2 micron, and 0.8 micron membrane filters. The resulting ink, which had a surface tension of about 30 dynes per centimeter, was incorporated into a Hewlett-Packard® 855C thermal ink jet printer (printing 600 spi black and 300 spi yellow) and printed onto a variety of plain papers next to the carbon black containing black ink supplied for the HP 855C (HP 51645A ink). Using high quality printing mode (checkerboarding, no heat during printing), good print quality was obtained for the yellow ink with minimal intercolor bleeding on the border between black and yellow. For comparison purposes, the black ink was also printed on the same set of papers alone, with no adjoining yellow images. The table below indicates the average MFLEN (Mid Frequency Line Edge Noise, Horizontal lines) of the HP 850C black ink when printed alone and the average MFLEN of the HP 850C black ink when printed next to the yellow ink. MFLEN was evaluated by measuring the average MFLEN number of a line (average edge sharpness of both top and bottom edges of a horizontal line). The MFLEN number was obtained by equipment consisting of a personal computer, an illuminating light source, a filter, and an imaging microscope with a CDD sensor. The equipment was calibrated with a standard image (line with sharp edges). Software using a Fourier Transform technique was used to calculate the MFLEN data and line width. Lower MFLEN numbers indicate better image quality. Intercolor bleed usually is caused by undesirable mixing of inks near the bordering areas and results in a distorted line image with irregular edges and large MFLEN values. The smaller MFLEN number is desirable because it shows sharper line image with reduced intercolor bleed.

| Paper | MFLEN adjacent to yellow | MFLEN alone |
|---|---|---|
| Xerox ® Recycled paper | 11.5 | 4.6 |
| Xerox ® Image Series LX 24 # Ashdown paper | 4.3 | 2.4 |
| Hammermill Tidal DP, International Paper | 27.0 | 31.6 |
| Xerox ® 4024 DP, Union Camp | 7.0 | 1.5 |
| Rank Xerox, Premier ECF, Modo | 18.0 | 9.3 |
| Rank Xerox Premier TCF, Nymolla | 6.3 | 1.5 |
| Champion, Moji-Duacu, Brazil | 14.3 | 8.7 |
| Xerox ® 4024 DP, Champion Courtland | 4.4 | 0.5 |
| Average | 11.6 | 7.4 |

The selected papers represent major plain papers used throughout the world, including the United States, Europe, and Latin America, and are representative of a wide spectrum of papers used by consumers. As the results indicate, the average MFLEN for the black ink printed adjacent to the yellow ink (11.6) is close to the average MFLEN for the black ink printed alone without any ink next to its border (7.4).

For comparison purposes, the process was repeated with a similar yellow ink composition containing no ethylenediamine dihydrochloride. The average MFLEN in this instance was about 36.

EXAMPLE II

A black ink composition was prepared by simple mixing of the ingredients which contained 4.0 percent by weight carbon black (anionic dispersion IJX 56, obtained from Cabot Corp.), 23.2 percent by weight sulfolane, 6 percent by weight 2-pyrrolidinone, 2.9 percent by weight latex copolymer of benzylmethacrylate/ethoxytriethyleneglycol methacrylate/methacrylic acid, 0.05 percent by weight polyethylene oxide (bisphenol-A derivative, molecular weight 18,500, obtained from Polysciences Corp.), and deionized water (balance). The ink exhibited the following physical properties: viscosity: 2.18 centipoise at 25° C.; surface tension: 41.4 dynes per centimeter; frequency response (using a 600 spi printhead) 9 KiloHertz. The black ink thus prepared was incorporated into a Hewlett-Packard 855C printer and printed with the yellow ink prepared in Example I.

For comparison purposes, a yellow ink composition was prepared by simple mixing of the ingredients which contained 59.85 percent by weight PROJET YELLOW OAM (a liquid dye concentrate containing 7.5 percent by weight Acid Yellow 23 dye solids in water, obtained from Zeneca Colors), 21 percent by weight sulfolane, 18 percent by weight tripropylene glycol methyl ether (DOWANOL TPM, obtained from Dow Chemical Co.), 0.65 percent by weight (tris(hydroxymethylamino)methane), 0.35 percent by weight ethylene diamine tetraacetic acid, 0.1 percent by weight DOWICIL 200 (biocide, obtained from Dow Chemical Co.), and 0.05 percent by weight polyethylene oxide (bisphenol-A derivative, molecular weight 18,500, obtained from Polysciences Corp.). The ink was adjusted to a pH of 7.8 and filtered before use. The black ink was incorporated into a Hewlett-Packard 855C printer and printed with this yellow ink.

The table below indicates the average MFLEN of the black ink when printed next to the comparative yellow ink prepared in this Example (MFLEN II) and the average MFLEN of the black ink when printed next to the yellow ink of Example I (MFLEN I):

| Paper | MFLEN II | MFLEN I |
|---|---|---|
| Xerox ® Recycled paper | 52.5 | 8.5 |
| Xerox ® Image Series LX 24 # Ashdown paper | 16.1 | 8.6 |
| Hammermill Tidal DP, International Paper | 47.7 | 27 |
| Xerox ® 4024 DP, Union Camp | 34.4 | 8.7 |
| Rank Xerox, Premier ECF, Modo | 43.6 | 9.1 |
| Rank Xerox Premier TCF, Nymolla | 17.3 | 6.6 |
| Champion, Moji-Duacu, Brazil | 52.9 | 30.1 |
| Xerox ® 4024 DP, Champion Courtland | 30.9 | 2.2 |
| Average | 36.9 | 12.6 |

As the data indicate, intercolor bleed was substantially lower for the yellow ink containing ethylenediamine dihydrochloride (Example I yellow ink) than that of a yellow ink containing no di-, tri-, or polyquaternary ammonium salt (Example II yellow ink).

EXAMPLE III

A yellow ink composition was prepared by simple mixing of the ingredients which contained 40 percent by weight PROJET YELLOW OAM (a liquid dye concentrate containing 7.5 percent by weight Acid Yellow 23 dye solids in water, obtained from Zeneca Colors), 12 percent by weight sulfolane, 12 percent by weight acetylethanolamine, 8.92 percent by weight butyl carbitol, 2.57 percent by weight ethylenediamine diacetate, 6 percent by weight urea, 0.74 percent by weight imidazole, 0.074 percent by weight DOWICIL 200 (biocide, obtained from Dow Chemical Co.), 0.5 percent by weight ethylene diamine tetraacetic acid, 0.05 percent by weight polyethylene oxide (bisphenol-A derivative, molecular weight 18,500, obtained from Polysciences Corp.), and deionized water (balance). The yellow ink was filtered prior to use.

The yellow ink thus prepared was incorporated into a Hewlett-Packard 855C printer and printed with the black ink prepared in Example II. The printer also contained cyan and magenta inks supplied for the HP850C printers, and multicolored images were formed. The table below indicates the average MFLEN of the black ink of Example II when printed next to the yellow ink prepared in this Example:

| Paper | MFLEN |
|---|---|
| Xerox ® Recycled paper | 31.8 |
| Xerox ® Image Series LX 24 # Ashdown paper | 7.8 |
| Hammermill Tidal DP, International Paper | 29.4 |
| Xerox ® 4024 DP, Union Camp | 17.0 |
| Rank Xerox, Premier ECF, Modo | 24.4 |
| Rank Xerox Premier TCF, Nymolla | 15.6 |
| Champion, Moji-Duacu, Brazif | 25.3 |
| Xerox ® 4024 DP, Champion Courtland | 11.5 |
| Average | 20.3 |

EXAMPLE IV

The yellow ink prepared in Example III was incorporated into a Hewlett-Packard® 855C thermal ink jet printer and printed onto a variety of plain papers next to the carbon black containing black ink supplied for the HP 850 (HP 51 645A ink). The table below indicates the average MFLEN of the HP 850C black ink when printed next to the yellow ink of Example III:

| Paper | MFLEN |
|---|---|
| Xerox ® Recycled paper | 35.1 |
| Xerox ® Image Series LX 24 # Ashdown paper | 7.6 |
| Hammermill Tidal DP, International Paper | 28.6 |
| Xerox ® 4024 DP, Union Camp | 33.9 |
| Rank Xerox, Premier ECF, Modo | 19.6 |
| Rank Xerox Premier TCF, Nymolla | 12.9 |
| Champion, Moji-Duacu, Brazil | 22.6 |
| Xerox ® 4024 DP, Champion Courtland | 27.9 |
| Average | 23.5 |

EXAMPLE V

A black ink composition was prepared by simple mixing of the ingredients which contained 4 percent by weight carbon black solids (supplied as an anionic dispersion IJX 56, obtained from Cabot Corp.), 20 percent by weight sulfolane, 4.8 percent by weight tripropylene glycol methyl ether (DOWANOL TPM, obtained from Dow Chemical Co.), 1 percent by weight latex copolymer of benzylmethacrylate/ethoxytriethyleneglycol methacrylate/methacrylic acid, 0.05 percent by weight polyethylene oxide (bisphenol-A derivative, molecular weight 18,500, obtained from Polysciences Corp.), and deionized water (balance).

The resulting black ink was incorporated into a Hewlett-Packard® 855C thermal ink jet printer and printed onto a variety of plain papers next to the yellow ink prepared in Example I. For comparison purposes, this black ink was also printed next to the yellow ink supplied for the HP 850C. The table below indicates the average MFLEN of the black ink prepared in this Example when printed next to the yellow ink prepared in Example I (MFLEN I) and the average MFLEN of the black ink when printed next to the HP 850C yellow ink (MFLEN HP850C):

| Paper | MFLEN HP850C | MFLEN I |
|---|---|---|
| Xerox ® Recycled paper | 19.5 | 13.2 |
| Xerox ® Image Series LX 24 # Ashdown paper | 14.6 | 2.0 |
| Hammermill Tidal DP, Internationai Paper | 18.2 | 31.0 |
| Xerox ® 4024 DP, Union Camp | 33.7 | 21.8 |
| Rank Xerox, Premier ECF, Modo | 15.7 | 13.5 |
| Rank Xerox Premier TCF, Nymolla | 9.8 | 3.0 |
| Champion, Moji-Duacu, Brazil | 16.4 | 22.9 |
| Xerox ® 4024 DP, Champion Courtland | 18.7 | 2.6 |
| Average | 18.3 | 17.3 |

EXAMPLE VI

A black ink composition was prepared by simple mixing of the ingredients which contained 2.5 percent by weight carbon black solids (supplied as an anionic dispersion CABOJET® 300, obtained from Cabot Corp.), 22 percent by weight sulfolane, 6 percent by weight 2-pyrrolidinone, 1.48 percent by weight latex copolymer of benzylmethacrylate/ethoxytriethyleneglycol methacrylate/methacrylic acid, 0.05 percent by weight dipropylene glycol, 0.05 percent by weight polyethylene oxide (bisphenol-A derivative, molecular weight 18,500, obtained from Polysciences Corp.), and deionized water (balance). The black ink thus prepared was incorporated into a Hewlett-Packard 855C printer with the yellow ink prepared in Example III.

For comparison purposes, a yellow ink composition was prepared by simple mixing of the ingredients which contained 40 percent by weight PROJET YELLOW OAM (a liquid dye concentrate containing 7.5 percent by weight Acid Yellow 23 dye solids in water, obtained from Zeneca Colors), 10 percent by weight sulfolane, 20 percent by weight acetylethanolamine (solution containing 75 percent by weight acetylethanolamine in water), 9 percent by weight urea, 6 percent by weight butyl carbitol, 1 percent by weight imidazole, 0.1 percent by weight DOWICIL 150 (biocide, obtained from Dow Chemical Co.), 0.065 percent by weight ethylene diamine tetraacetic acid, 0.05 percent by weight polyethylene oxide (bisphenol-A derivative, molecular weight 18,500, obtained from Polysciences Corp.), and deionized water (balance). The black ink was incorporated into a Hewlett-Packard 855C printer and printed with this yellow ink.

The table below indicates the average MFLEN of the black ink when printed next to the comparative yellow ink prepared in this Example (MFLEN VI) and the average MFLEN of the black ink when printed next to the yellow ink of Example III (MFLEN III):

| Paper | MFLEN VI | MFLEN III |
| --- | --- | --- |
| Xerox ® Recycled paper | 32.3 | 31.8 |
| Xerox ® Image Series LX 24 # Ashdown paper | 17.8 | 7.8 |
| Hammermill Tidal DP, International Paper | 43.7 | 29.4 |
| Xerox ® 4024 DP, Union Camp | 37.6 | 17 |
| Rank Xerox, Premier ECF, Modo | 34.2 | 24.4 |
| Rank Xerox Premier TCF, Nymolla | 22.4 | 15.6 |
| Champion, Moji-Duacu, Brazil | 32.8 | 25.3 |
| Xerox ® 4024 DP, Champion Courtland | 22.7 | 11.5 |
| Average | 30.4 | 20.3 |

As the data indicate, intercolor bleed was substantially lower for the yellow ink containing ethylenediamine diacetate (Example III yellow ink) than that of a yellow ink containing no di-, tri-, or polyquaternary ammonium salt (Example VI yellow ink).

EXAMPLE VII

The HP 850C carbon black containing black ink was printed on the set of plain papers with a Hewlett-Packard 855C printer to create black solid areas for optical density measurements (control). In a separate experiment, the yellow ink prepared in Example I was printed on the same set of papers first, followed by printing of the HP black ink on top of the yellow images. The optical densities of the black images alone on the papers ($OD_{alone}$) and the optical densities of the black images printed on top of the yellow images ($OD_{yellow}$) were as follows:

| Paper | $OD_{alone}$ | $OD_{yellow}$ |
| --- | --- | --- |
| Xerox ® Recycled paper | 1.47 | 1.53 |
| Xerox ® Image Series LX 24 # Ashdown paper | 1.51 | 1.52 |
| Hammermill Tidal DP, International Paper | 0.98 | 1.39 |
| Xerox ® 4024 DP, Union Camp | 1.45 | 1.52 |
| Rank Xerox Premier TCF, Nymolla | 1.56 | 1.53 |
| Champion, Moji-Duacu, Brazil | 1.40 | 1.56 |
| Xerox ® 4024 DP, Champion Courtland | 1.34 | 1.50 |
| Average | 1.39 | 1.51 |

As the data indicate, the optical density of the black ink is sensitive to the substrate used. An overall increase in average optical density of the black image was observed when the yellow ink was printed under the black ink.

EXAMPLE VIII

A yellow ink composition was prepared by simple mixing of the ingredients which contained 3 percent by weight PROJET YELLOW OAM dye, 10 percent by weight sulfolane, 6 percent by weight butyl carbitol, 15 percent by weight acetylethanolamine, 9 percent by weight urea, 1.9 percent by weight ethylenediamine dihydrochloride, 0.05 percent by weight imidazole, 0.1 percent by weight DOWICIL 200 (biocide, obtained from Dow Chemical Co.), 0.05 percent by weight ethylene diamine tetraacetic acid, 0.05 percent by weight polyethylene oxide (bisphenol-A derivative, molecular weight 18,500, obtained from Polysciences Corp.), and deionized water (balance). The pH of the ink was adjusted to 7.3 and the ink was filtered through 1.2 micron and 0.8 micron filters. The ink exhibited a viscosity of 3.25 centipoise at 25° C. and a surface tension of 38.5 dynes per centimeter. The ink thus prepared was incorporated into a thermal ink jet printing test fixture capable of jetting 600 spi black and 600 spi color. The 1st drop latency was ≧10 seconds, the 9th drop latency was ≧50 seconds, and the frequency response was ≧8 Kilo-Hertz. The black ink prepared in Example II was also incorporated into the test fixture, and black and yellow images were printed adjacent to each other on the eight papers of Example II. The average MFLEN was 15.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink, thereby enabling reduced intercolor bleed.

2. A set of inks according to claim 1 wherein the colorant in the first ink is an anionic dye.

3. A set of inks according to claim 1 wherein the colorant in the first ink includes pigment particles.

4. A set of inks according to claim 1 wherein the second ink further contains a material selected from the group consisting of monoquaternary ammonium salts, monovalent metal salts, multivalent metal salts, and mixtures thereof.

5. A set of inks according to claim 1 wherein the ammonium salt in the second ink is a molecule containing exactly two cationic ammonium functional groups in the molecule.

6. A set of inks according to claim 1 wherein the ammonium salt in the second ink is an ethylenediamine salt.

7. A set of inks according to claim 1 wherein the ammonium salt is present in the second ink in an amount of from about 0.001 to about 15 percent by weight of the ink.

8. A set of inks according to claim 1 wherein at least one of the first ink and the second ink contains a humectant.

9. A set of inks according to claim 1 wherein the ammonium salt in the second ink is selected from the group consisting of ethylenediamine salts, N-methylethylenediamine salts, N,N-dimethylethylenediamine salts, N,N'-dimethylethylenediamine salts, N-methyl,N'-ethyl-ethylenediamine salts, N,N'-diethylethylenediamine salts, 1,5-diaminopentane salts, 1,4-diaminopiperazine salts, 1,6-hexanediamine salts, piperazine salts, 4-aminopyridine salts, 3-aminopyrrolidine salts, 5-aminoquinuclidine salts, 5-amino-8-hydroxyquinoline salts, 1,4-diaminocyclohexane salts, 1,4-diaminobenzene salts, 1,2-diaminobenzene salts, 1,3-diaminobenzene salts, hexamethonium chloride, hexamethonium salts, salts of diaminoethyl ether of polyethyleneglycol, salts of diaminoethyl ether of polyproyleneglycol, N,N,N',N',N"-pentamethyldiethylenetriamine salts, 1,3,5-triazine salts, 1,4,7-triazacyclononane salts, 1,2,4,-triazole salts, glycerol tris((poly(propylene glycol), amine terminated) ether salts, glycerol tris((polyethylene glycol), amine terminated) ether salts, isomers thereof, and mixtures thereof.

10. A set of inks according to claim 1 wherein the ammonium salt in the second ink is selected from the group consisting of ethylenediamine dihydrochloride, ethylenediamine dihydrobromide, ethylenediamine dihydroiodide, ethylenediamine dinitrate, ethylenediamine dihydrosulfate, ethylenediamine diformate, ethylenediamine diacetate, ethylenediamine dipropionate, N-methylethylenediamine dihydrochloride, N-methylethylenediamine dihydrobromide, N-methylethylenediamine dihydroiodide, N-methylethylenediamine dinitrate, N-methylethylenediamine dihydrosulfate, N-methylethylenediamine diformate, N-methylethylenediamine diacetate, N-methylethylenediamine dipropionate, N,N-dimethylethylenediamine dihydrochloride, N,N-dimethylethylenediamine dihydrobromide, N,N-dimethylethylenediamine dihydroiodide, N,N-dimethylethylenediamine dinitrate, N,N-dimethylethylenediamine dihydrosulfate, N,N-dimethylethylenediamine diformate, N,N-dimethylethylenediamine diacetate, N,N-dimethylethylenediamine dipropionate, N,N'-dimethylethylenediamine dihydrochloride, N,N'-dimethylethylenediamine dihydrobromide, N,N'-dimethylethylenediamine dihydroiodide, N,N'-dimethylethylenediamine dinitrate, N,N'-dimethylethylenediamine dihydrosulfate, N,N'-dimethylethylenediamine diformate, N,N'-dimethylethylenediamine diacetate, N,N'-dimethylethylenediamine dipropionate, N-methyl,N'-ethyl-ethylenediamine dihydrochloride, N-methyl,N'-ethyl-ethylenediamine dihydrobromide, N-methyl,N'-ethyl-ethylenediamine dihydroiodide, N-methyl,N'-ethyl-ethylenediamine dinitrate, N-methyl,N'-ethyl-ethylenediamine dihydrosulfate, N-methyl,N'-ethyl-ethylenediamine diformate, N-methyl,N'-ethyl-ethylenediamine diacetate, N-methyl,N'-ethyl-ethylenediamine dipropionate, N,N'-diethylethylenediamine dihydroiodide, N,N'-diethylethylenediamine dinitrate, N,N'-diethylethylenediamine dihydrosulfate, N,N'-diethylethylenediamine diformate, N,N'-diethylethylenediamine diacetate, N,N'-diethylethylenediamine dipropionate, 1,5-diaminopentane dihydrochloride, 1,5-diaminopentane diacetate, 1,4-diaminopiperazine dihydrochloride, 1,4-diaminopiperazine diacetate, 1,6-hexanediamine dihydrochloride, 1,6-hexanediamine dihydrobromide, 1,6-hexanediamine dihydroiodide, 1,6-hexanediamine diformate, 1,6-hexanediamine diacetate, piperazine dihydrochloride, piperazine diacetate, 4-aminopyridine dihydrochloride, 4-aminopyridine diacetate, 4-aminopyridine dihydrobromide, 4-aminopyridine dipropionate, 3-aminopyrrolidine dihydrochloride, 3-aminopyrrolidine dihydrobromide, 3-aminopyrrolidine diacetate, 5-aminoquinuclidine dihydrocloride, 5-aminoquinuclidine dibromide, 5-aminoquinuclidine diacetate, 5-amino-8-hydroxyquinoline dihydrochloride, 5-amino-8-hydroxyquinoline dihydrobromide, 5-amino-8-hydroxyquinoline diacetate, 1,4-diaminocyclohexane dihydrochloride, 1,4-diaminocyclohexane diacetate, 1,4-diaminobenzene dihydrochloride, 1,4-diaminobenzene diacetate, 1,2-diaminobenzene dihydrochloride, 1,2-diaminobenzene diacetate, 1,3-diaminobenzene dihydrochloride, 1,3-diaminobenzene diacetate, hexamethonium chloride, hexamethonium bromide, dihydrochloride salt of diaminoethyl ether of polyethyleneglycol, dihydrobromide salt of diaminoethyl ether of polyethyleneglycol, dihydroiodide salt of diaminoethyl ether of polyethyleneglycol, dinitrate salt of diaminoethyl ether of polyethyleneglycol, diacetate salt of diaminoethyl ether of polyethyleneglycol, dihydrochloride salt of diaminoethyl ether of polyproyleneglycol, dihydrobromide salt of diaminoethyl ether of polypropyleneglycol, dihydroiodide salt of diaminoethyl ether of polypropyleneglycol, dinitrate salt of diaminoethyl ether of polypropyleneglycol, diacetate salt of diaminoethyl ether of polypropyleneglycol, N,N,N',N',N"-pentamethyldiethylenetriamine trihydrochloride, N,N,N',N', N"-pentamethyldiethylenetriamine trihydrobromide, N,N,N',N',N"-pentamethyldiethylenetriamine trihydroiodide, N,N,N',N',N"-pentamethyldiethylenetriamine triformate, N,N,N',N',N"-pentamethyldiethylenetriamine triacetate, 1,3,5-triazine trihydrochloride, 1,3,5-triazine trihydrobromide, 1,3,5-triazine trihydrolodide, 1,3,5-triazine triformate, 1,3,5-triazine triacetate, 1,3,5-triazine tripropionate, 1,4,7-triazacyclononane trihydrochloride, 1,4,7-triazacyclononane trihydrobromide, 1,4,7-triazacyclononane trihydroiodide, 1,4,7-triazacyclononane triformate, 1,4,7-triazacyclononane triacetate, 1,4,7-triazacyclononane tripropionate, 1,2,4,-triazole trihydrochloride, 1,2,4,-triazole trihydrobromide, 1,2,4,-triazole trihydroiodide, 1,2,4,-triazole triformate, 1,2,4,-triazole triacetate, 1,2,4,-triazole tripropionate, glycerol tris ((poly(propylene glycol), amine terminated) ether trihydrochloride, glycerol tris((polypropylene glycol), amine terminated) ether trihydrobromide, glycerol tris ((polypropylene glycol), amine terminated) ether trihydroiodide, glycerol tris((polypropylene glycol), amine terminated) ether triformate, glycerol tris((polypropylene glycol), amine terminated) ether triacetate, glycerol tris ((polypropylene glycol), amine terminated) ether tripropionate, glycerol tris((polyethylene glycol), amine terminated) ether trihydrochloride, glycerol tris ((polyethylene glycol), amine terminated) ether trihydrobromide, glycerol tris((polyethylene glycol), amine terminated) ether trihydroiodide, glycerol tris((polyethylene glycol), amine terminated) ether triformate, glycerol tris ((polyethylene glycol), amine terminated) ether triacetate, glycerol tris((polyethylene glycol), amine terminated) ether tripropionate, isomers thereof, and mixtures thereof.

11. A set of inks according to claim 1 wherein the ammonium salt in the second ink is a polymer or copolymer containing more than three cationic ammonium groups per molecule and is selected from the group consisting of poly(allylamine) salts, poly(diallyldimethylammonium) salts, poly(4-vinylpyridine) salts, polyamine salts, polyethyleneimine salts, alkylpolyethyleneimine salts, hydroxyethylated polyethyleneimine salts, polyvinylpyridinium salts, polyalkylpyridinium salts, polvinylybenzyl ammonium salts, and mixtures thereof.

12. A set of inks according to claim 1 wherein the second ink contains no colorant.

13. A multicolor ink jet printing process which comprises: (a) incorporating into an ink jet printer a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; (b) incorporating into the ink jet printer a second ink comprising water, an optional colorant having a color other than the first color, and an ammonium salt having at least two cationic ammonium functional groups; (c) causing droplets of the first ink to be ejected in an imagewise pattern onto a substrate; and (d) causing droplets of the second ink to be ejected in an imagewise pattern onto the substrate, wherein the colorant in the first ink is immobilized on the substrate by interaction with the ammonium salt having at least two cationic ammonium functional groups in the second ink, thereby enabling reduced intercolor bleed.

14. A process according to claim 13 wherein the second ink is printed onto the substrate before the first ink.

15. A process according to claim 13 wherein the first ink is printed onto the substrate before the second ink.

16. A process according to claim 13 wherein the second ink contains no colorant.

17. A process according to claim 13 wherein at least one of the inks is jetted through a printhead capable of printing at least 360 spots per inch.

18. A process according to claim 13 wherein the substrate is heated before, during, or after printing.

19. A process according to claim 13 wherein the printer employs a process selected from thermal ink jet printing, acoustic ink jet printing, continuous stream ink jet printing, or piezoelectric ink jet printing.

20. A process according to claim 13 wherein at least some of the second ink is printed on top of the first ink on the substrate.

21. A process according to claim 13 wherein at least some of the first ink is printed on top of the second ink on the substrate.

22. A process according to claim 13 wherein the second ink contains no colorant, wherein a third ink comprising water and a colorant having a color other than the first color is incorporated into the ink jet printer, wherein droplets of the third ink are caused to be ejected in an imagewise pattern onto the substrate, and wherein droplets of the second ink are caused to be printed onto the substrate between images of the first ink and images of the third ink.

23. A process according to claim 13 wherein the ink jet printer employs a printhead which is a partial width printhead, a partitioned printhead, or a full width array printhead.

24. A set of inks according to claim 1 wherein the second ink contains a colorant.

* * * * *